R. S. TROTT.
VEHICLE SPRING SUSPENSION.
APPLICATION FILED JAN. 30, 1914.
1,247,749.
Patented Nov. 27, 1917.
4 SHEETS—SHEET 1.
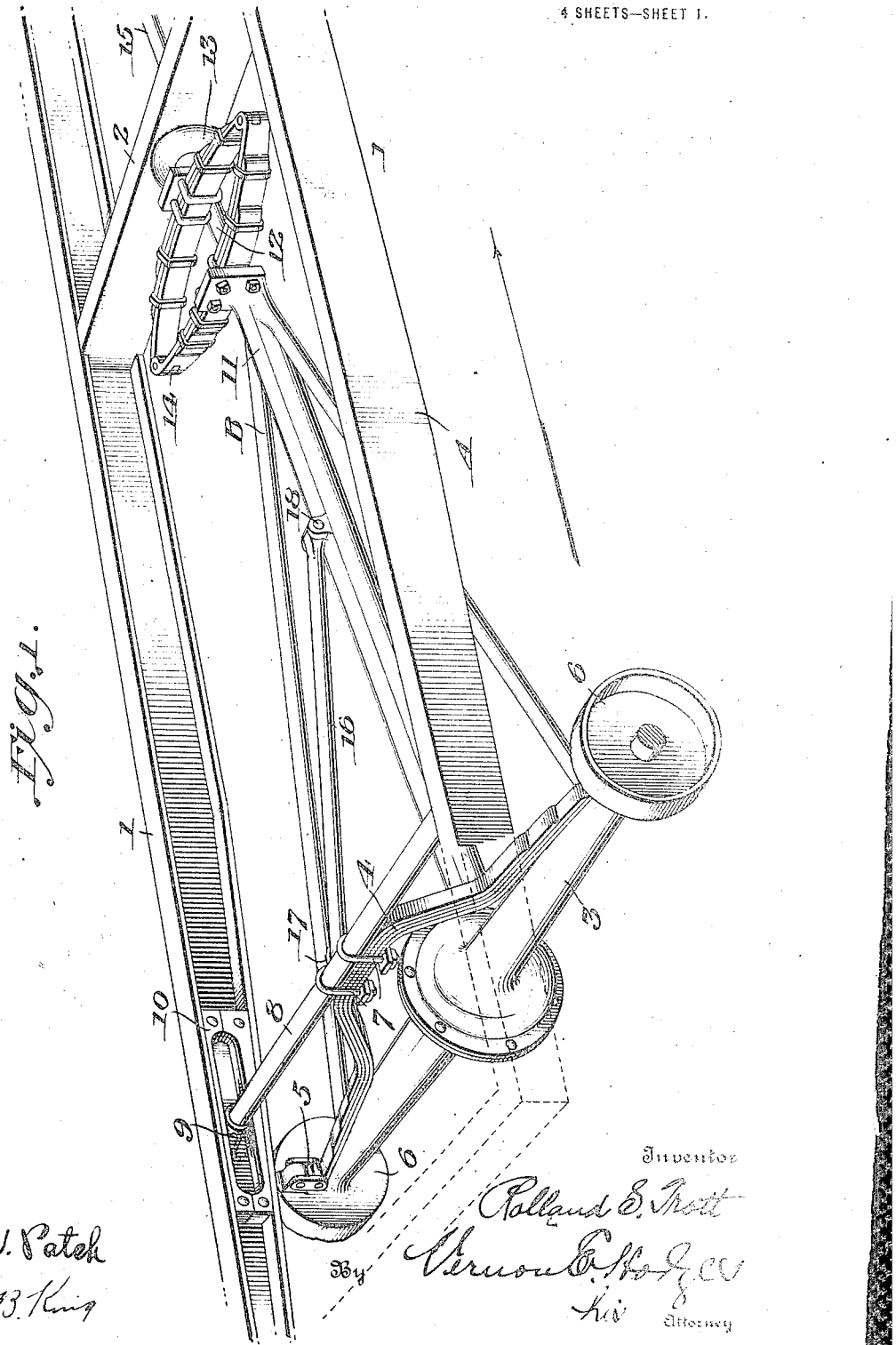

R. S. TROTT.
VEHICLE SPRING SUSPENSION.
APPLICATION FILED JAN. 30, 1914.
1,247,749.
Patented Nov. 27, 1917.
4 SHEETS—SHEET 2.
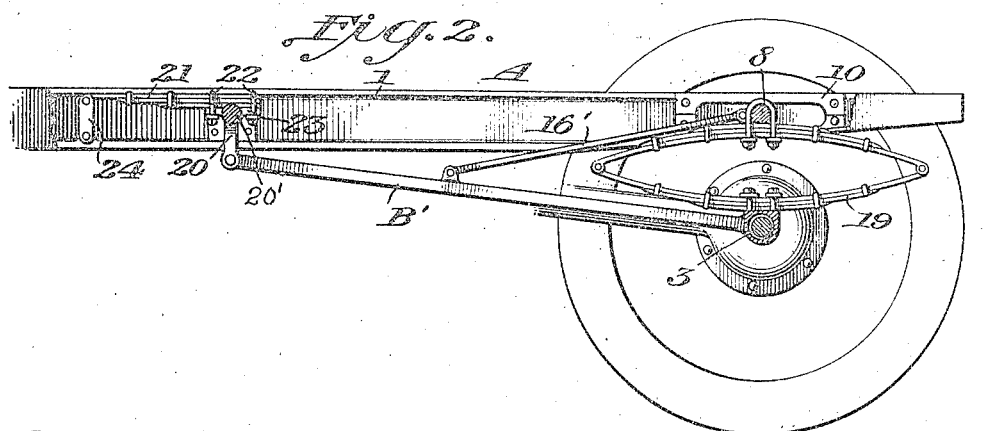
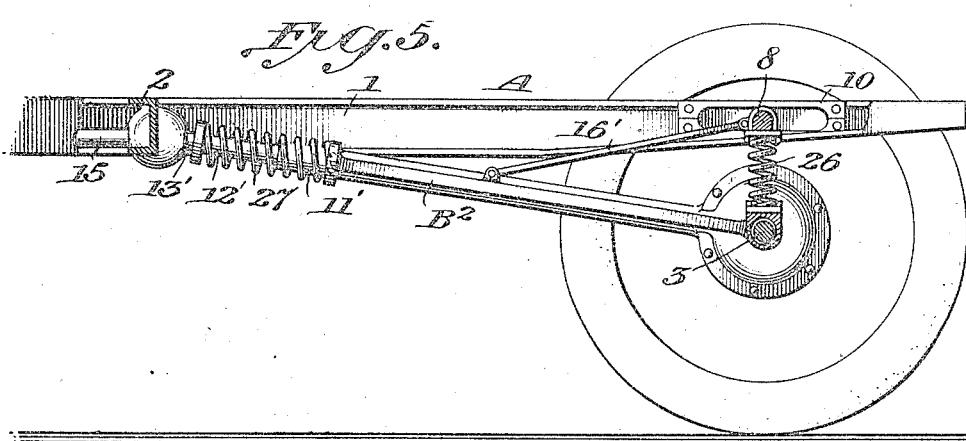
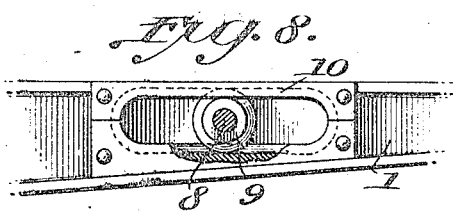
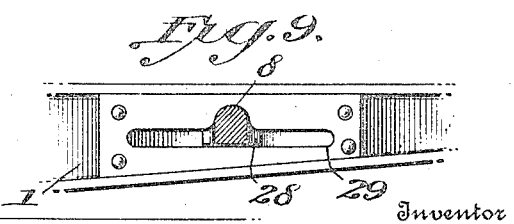

R. S. TROTT.
VEHICLE SPRING SUSPENSION.
APPLICATION FILED JAN. 30, 1914.

1,247,749.

Patented Nov. 27, 1917.
4 SHEETS—SHEET 3.

Witnesses
Lloyd W. Patch
H. B. King

Inventor
Rolland S. Trott
By Vernon E. Hodges
his Attorney

UNITED STATES PATENT OFFICE.

ROLLAND S. TROTT, OF DENVER, COLORADO.

VEHICLE SPRING SUSPENSION.

1,247,749. Specification of Letters Patent. Patented Nov. 27, 1917.

Application filed January 30, 1914. Serial No. 815,444.

*To all whom it may concern:*

Be it known that I, ROLLAND S. TROTT, a citizen of the United States, residing at the city and county of Denver and State of Colorado, have invented certain new and useful Improvements in Vehicle Spring Suspensions, of which the following is a specification.

My invention relates to an improvement in vehicle spring suspensions, and more particularly to that form of spring suspension shown in Patents Nos. 1,029,731 and 1,029,732 granted to me on June 18, 1912.

The object of this invention is to provide a structure in which the axle is free to move in a direction longitudinally of the frame, and the spring has the same movement simultaneously with respect to the frame.

A further object is to so arrange the parts that the spring and axle always maintain approximately the same relative longitudinal position with respect to each other.

This invention relates to certain other novel features of construction and combinations of parts which will be hereinafter fully described and pointed out in the claims.

In the accompanying drawings:—

Figure 3:
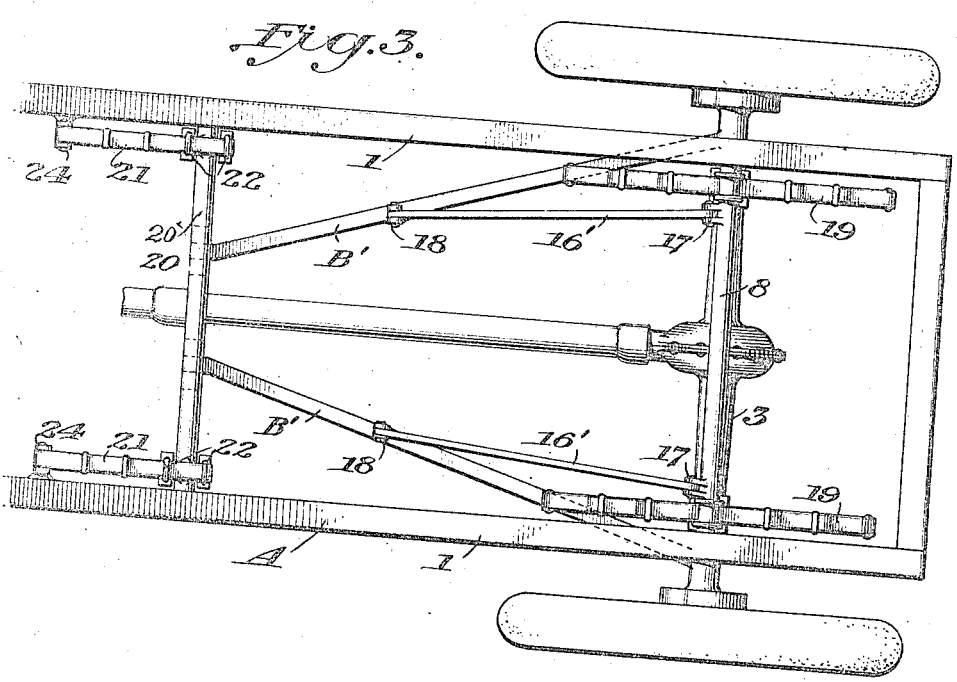
Figure 4:
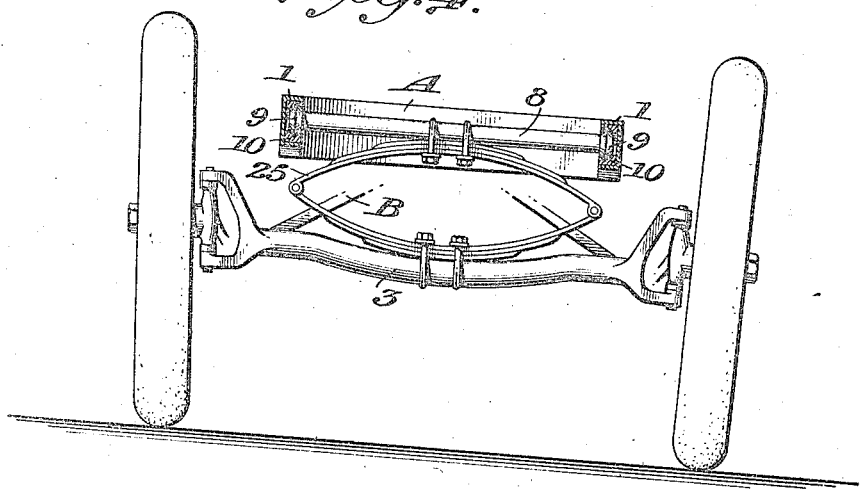
Figure 6:
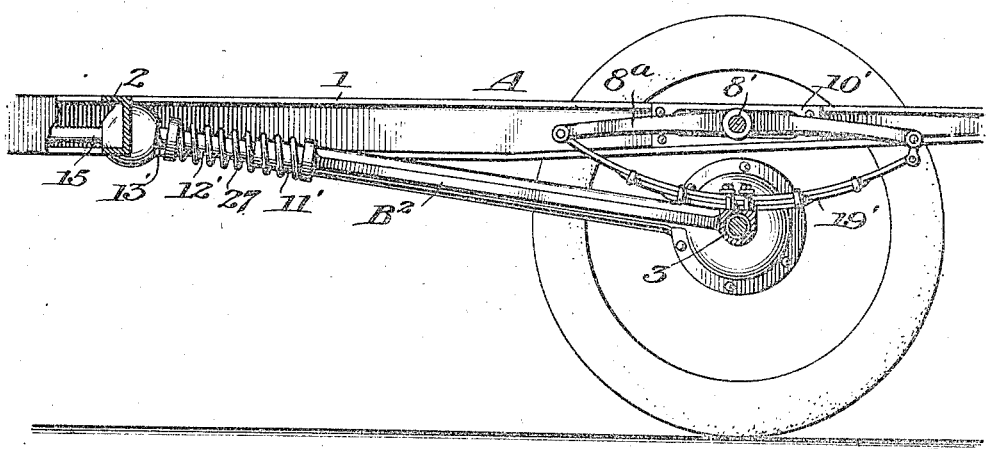
Figure 7:
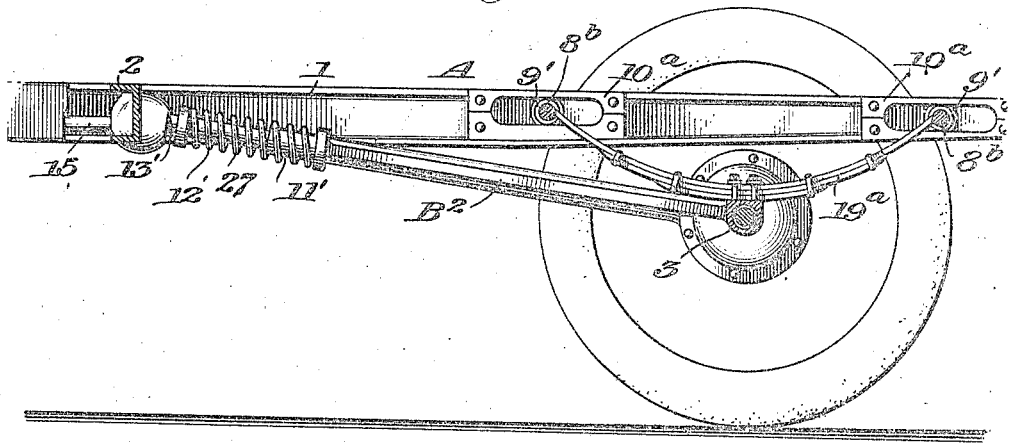

Figure 1 is a view in perspective showing one form which the invention might take, Fig. 2 is a view partly in section showing a slightly different arrangement of the parts, Fig. 3 is a top plan view showing the form which might be adapted to the structure shown in Fig. 2, Fig. 4 is a view in end elevation to illustrate another adaptation of load-springs, Figs. 5, 6 and 7 show other forms which the invention might take, and Figs. 8, 9 and 10 are detail views to better illustrate forms and arrangements of parts which may be used for connecting the load-springs with the frame.

The frame A is constructed in the usual manner to comprise longitudinally-extending side-bars 1, 1, and suitable cross-bars 2. The axle 3 is also of the usual type, as shown in Fig. 1.

A modification of the semi-elliptic spring 4 is shown connected across the axle at its ends, by links 5, to the brake-housings 6. This spring 4 is shown of the multiple-leaf type and is connected at its approximate center by clips 7 with a cross-shaft 8 which extends parallel with the axle 3.

At each end of the shaft 8, a friction-roll 9 is mounted. These rolls, as better shown in Figs. 4 and 6, have the contact-faces thereof made V-shaped, and a suitable track 10 is secured to the side-members 1 of the frame, or is formed as an integral part thereof in which these rolls travel and are guided.

A V-shaped reach B is secured to the axle near the ends thereof. At the angle of the reach, a sleeve 11 is provided, and a member 12 secured by a ball and socket joint 13 to the cross-bar 2 of the frame is adapted to fit and slide in the sleeve 11. A full elliptic spring 14 is secured on its one side to the reach B and on its opposite side to the universal joint 13.

In the structure shown in Fig. 1, the invention is disclosed as applied to the rear axle, and in this adaptation the sleeve 11 and the member 12, also the joint 13 are made hollow to provide a housing for the drive-shaft 15. A radius-rod 16 is pivotally connected to the shaft 8 at 17, and the opposite end of the radius rod is pivoted at 18 to the sleeve 11.

When the invention is in the form described, the vehicle would be traveling in the direction of the arrow. Any obstruction in the road struck by the wheels mounted on the axle would cause the axle to be moved longitudinally of the frame, or, perhaps more correctly speaking, the axle would be held as the frame moves forward until the load-spring 4 compresses itself sufficiently that the wheel may ride over the obstruction. After the obstruction is passed, the axle is again restored to its normal position by the spring 14 connected with the reach B. By the connection of the spring 4 with the shaft 8, which is in turn held in the frame by the friction-rolls 9, this movement of the axle in the direction of the lonthe longitudinal extent of the frame, and by reason of the fact that the friction rolls 9 and the tracks 10 in which they travel are made as described, the shaft 8 on which the friction-rolls 9 are mounted would be held at all times also substantially at right angles to the longitudinal extent of the frame, and all binding would be precluded.

In the form shown in Fig. 2, the full elliptic load-springs 19 are connected between the axle 3 and the shaft 8, and in this form the reach B' is made slightly different, it being, as shown in Fig. 3, composed of two members connected near the ends of the axle, and at their forward ends pivotally connected with arms 20 extending from a rock-shaft 20' between the side members 1 of the frame. In this form, a straight leaf-spring 21 is rigidly connected at its one end by clips 22 to arms 23 provided on the rock shaft 20', and at its opposite end the spring 21 is connected by a link 24 with the frame. As the axle is moved backwardly or forwardly from its normal position, the rock-shaft 20' is twisted around its pivot, and this swinging movement is resiliently opposed by the spring 21, and, as the obstruction is passed, the rock-shaft and consequently the axle through the connection of the reach B' is restored to its normal position.

With the form shown in Figs. 2 and 3, it is preferable that two radius rods 16', 16', be provided to connect between the shaft 8 and the reach B'.

In Fig. 4, the full elliptic load-spring 25 is shown in a cross-axle mounting, and in this form the parts would be as described.

Fig. 5 discloses an adaptation of the spiral load-spring to a structure very similar to that disclosed in Fig. 1. In this form the spiral springs 26 are mounted between the axle 3 and the shaft 8, and the reach structure may be of any type so long as both the axle and the shaft may have movement longitudinally of the frame.

A different form of endwise shock-spring is also illustrated in Fig. 5. Here the reach is arranged similar to the disclosure in Fig. 1, and a spiral spring 27 is received around the member 12', and the end of the sleeve 11', and is connected at its one end with the reach B² and at its opposite end to the movable member of the ball and socket joint 13'.

With the arrangement illustrated in Figs. 6 and 7, the same reach structure B² and endwise shock-spring 27 are adapted as made of such a length on each side of the shaft 8' that the load-spring 19' can be connected at its ends thereto, and any suitable arrangement may be made at this connection between the spring and the cross-arms to accommodate the extension of the spring due to its flexion.

As illustrated in Fig. 7, two shafts 8ᵇ are provided to extend across the frame, and these shafts are held and guided in the tracks 10ᵃ by the friction-rolls 9'. The load-springs 19ᵃ are connected at each end to the shafts 8ᵇ.

With these two forms, the load-springs 19' and 19ᵃ, respectively, are connected rigidly with the axle or axle-housing 3, and as the shafts 8' and 8ᵇ are connected direct with the load-springs 19' and 19ᵃ, these shafts will be caused to move longitudinally of the frame in the tracks provided therefor; and it will, of course, be understood that the axle will be maintained in a position at all times at right angles to the longitudinal extent of the frame, and that this movement of the axle longitudinally of the frame will be resiliently opposed by the spring 27, or other suitable endwise shock-spring.

In Fig. 8, the friction-rolls 9 are illustrated to better show the manner in which they are mounted to move in the guides on the frame.

Fig. 9 shows a slightly different form of guiding means or slide which might be used at the ends of the shaft 8. In this form, a bearing-member 28 is provided at each end of the shaft 8, and a slot 29 is provided on each of the side-members 1 of the frame, in which the slide-member 28 is mounted to permit movement of the shaft longitudinally of the frame.

In Fig. 10, a modified form of mounting is disclosed for the connection between the shaft 8 and the frame. Here a bracket 30 is carried by each of the side members 1 of the frame. A link 31 is pivoted at its one end to the bracket 30, and at the opposite end of the link the shaft 8 is pivoted. This form of connection would procure a slightly different action, but the result accomplished would be the same, and it will be noted that the link 31 is always preferably mounted so that it is in tension.

From the foregoing it will be seen that I have provided a vehicle spring suspension which comprises an axle connected by a reach with the frame to have movement longitudinally of the frame, and by forming the connection between the load-springs and the frame to have a like movement, and connecting the two parts to move together, all binding action as the axle is moved in one direction or the other longitudinally of the frame is overcome.

It is evident that more or less slight changes might be resorted to in the form and arrangement of the several parts described without departure from the spirit and scope of my invention, and hence I do not wish to be limited to the precise construction herein set forth, but:—

I claim:—

1. The combination with a vehicle-frame, of an axle, a shaft connected across the frame to have movement longitudinally thereof, springs connected between said shaft and axle to permit like movement of the axle, and means to resiliently oppose said movement of the axle and shaft.

2. The combination with a vehicle-frame, of an axle, a shaft connected across the frame to have movement longitudinally thereof, springs connected between said shaft and axle, a connection formed between the shaft and axle whereby they are held approximately in the same longitudinal relation to the springs, and means for resiliently opposing said longitudinal movement of the shaft.

3. The combination with a vehicle-frame, of an axle, a shaft connected across the frame, means for holding the shaft in a position approximately at right angles to the longitudinal extent of the frame and to permit movement of the shaft longitudinally of the frame, load-springs connected between the shaft and axle, a connection formed between the shaft and axle whereby they are held approximately in the same longitudinal relation one with the other, and means for resiliently opposing the longitudinal movement of the shaft.

4. The combination with a vehicle-frame, of an axle, a shaft connected across the frame to have movement longitudinally thereof, load-springs connected between the shaft and axle, means for holding the axle in a position approximately at right angles to the line of draft, and means connected between the shaft and said means for holding the axle whereby the shaft and axle are held approximately in the same longitudinal relation one with the other.

5. The combination with a vehicle-frame, of an axle, a reach secured to the axle and connected with the frame in such a manner that the axle has movement longitudinally of the frame, and all lateral twisting movement is precluded, a shaft mounted on the frame and adapted to have movement longitudinally thereof, load-springs connected between the shaft and axle, radius-rods connected between the shaft and reach in such a manner that as the axle moves longitudinally of the frame, the shaft is moved simultaneously, and means for resiliently opposing said longitudinal movement of the axle.

6. The combination with a vehicle frame, a cross-shaft having sliding connection therewith, an axle, and a load-spring extending from the axle to the cross-shaft, of means for opposing the horizontal movement of the cross-shaft with respect to the frame.

7. The combination with a vehicle frame, of an axle, a shaft connected to the axle and having sliding connection at its ends with the frame, and means between the axle and frame to maintain the axle at right-angles to the line of draft, and means connected to the first means to resiliently oppose horizontal movement of the axle.

8. The combination with a vehicle frame, of a cross-shaft connected across the frame to have movement longitudinally thereof, an axle, springs connecting said shaft and axle, and means between the axle and frame to maintain the axle at right-angles to the line of draft, and means connected to the first means to resiliently oppose horizontal movement of the axle.

9. The combination with a vehicle frame, of an axle, a cross-shaft connected across the frame to have movement longitudinally thereof, springs connected between shaft and axle, means joining frame and axle to maintain the axle at right-angles to the line of draft, and means connected with the first-named means and the frame to resiliently oppose horizontal movement of the axle.

10. The combination with a vehicle frame, axle and load-springs, said axle and load-springs connected for movement longitudinal of the frame, of a rock-shaft, operative connections between the rock-shaft and the axle, and means for resiliently resisting axial rotation of the rock-shaft.

11. The combination with a frame, axle and load springs, said axle and load springs having horizontally moving connection with the frame, of a rock-shaft carried by the frame, arms extending from the rock-shaft, means operatively connecting said arms to the axle, and means connected with the rock-shaft and frame for resiliently resisting axial rotation of the rock-shaft.

12. The combination with a vehicle frame, axle and load-springs, said load-springs and axle having horizontally sliding connection with the frame, of a rock-shaft supported by the frame, means for resiliently resisting axial rotation of said rock-shaft, arms extending from the rock-shaft and means operatively connecting said arms to the axle for keeping the latter at right angles to the frame.

13. The combination with a vehicle frame,

14. The combination with a vehicle frame, axle, load springs between the axle and the frame connected with the frame and ca- Witnesses:
HARRY J. OSBORNE,
W. S. CROWELL.